United States Patent
Pei et al.

(10) Patent No.: US 8,552,944 B2
(45) Date of Patent: Oct. 8, 2013

(54) PIXEL STRUCTURE AND CONTROL SYSTEM FOR CONTROLLING THE SAME

(75) Inventors: Chih-Chun Pei, Taoyuan (TW); Chih-Jen Hu, Chung Li (TW); Chih-Ming Chang, Taoyuan Hsien (TW); Mu-Jen Su, Tainan (TW)

(73) Assignee: AU Optronics Corp., Hsinchu-Chu (TW)

( * ) Notice: Subject to any disclaimer, the term of this patent is extended or adjusted under 35 U.S.C. 154(b) by 1978 days.

(21) Appl. No.: 11/501,834

(22) Filed: Aug. 10, 2006

(65) Prior Publication Data

US 2006/0267892 A1 Nov. 30, 2006

(30) Foreign Application Priority Data

Aug. 12, 2004 (TW) .............................. 94127634 A

(51) Int. Cl.
*G09G 3/36* (2006.01)
*G02F 1/1335* (2006.01)

(52) U.S. Cl.
USPC ............................................. 345/87; 349/106

(58) Field of Classification Search
USPC ........................... 345/87–104; 349/106–144
See application file for complete search history.

(56) References Cited

U.S. PATENT DOCUMENTS

| | | | | |
|---|---|---|---|---|
| 5,499,126 | A * | 3/1996 | Abileah et al. | 349/106 |
| 6,169,590 | B1 * | 1/2001 | Abileah et al. | 349/120 |
| 6,847,426 | B2 * | 1/2005 | Fujimori et al. | 349/113 |
| 7,142,272 | B2 * | 11/2006 | Fujimori et al. | 349/114 |
| 7,307,644 | B2 * | 12/2007 | Glen | 345/690 |
| 7,379,134 | B2 * | 5/2008 | Park et al. | 349/114 |
| 7,388,630 | B2 * | 6/2008 | Shin et al. | 349/109 |
| 7,956,962 | B2 * | 6/2011 | Lee et al. | 349/114 |
| 8,072,403 | B2 * | 12/2011 | Hsieh et al. | 345/87 |
| 8,208,099 | B2 * | 6/2012 | Utsumi et al. | 349/109 |
| 2004/0189925 | A1 * | 9/2004 | Ohmuro et al. | 349/144 |
| 2004/0252260 | A1 * | 12/2004 | Nishida et al. | 349/107 |

* cited by examiner

*Primary Examiner* — Rodney Amadiz
(74) *Attorney, Agent, or Firm* — Birch, Stewart, Kolasch & Birch, LLP

(57) ABSTRACT

A pixel structure on a display panel comprises three sub-pixels where each sub-pixel can be arranged to a first transmissive region and a second transmissive region. The first transmissive region has a first transistor along with a first photo-resistant layer as well as the second transmissive region has a second transistor along with a second photo-resistant layer. The first photo-resistant layer and the second photo-resistant layer of different thickness or area are formed on a color filter. There exists a function relation between data signals received from the first transistor and the second transistor. Using these two data signals and combining the photo-resistant layers of different thickness or area will make each sub-pixel generate new level of brightness in gray scale and increase the number of displaying colors.

17 Claims, 9 Drawing Sheets

PIXEL STRUCTURE AND CONTROL SYSTEM FOR CONTROLLING THE SAME

BACKGROUND OF THE INVENTION (1) Field of the Invention

The invention relates to a pixel structure and a control system for controlling the pixel system, specifically to such a structure and such a control system which can improve chromaticity and brightness for the pixel.

(2) Description of the Prior Art

A liquid crystal panel primarily comprises a substrate, a color filter, and a liquid crystal layer between the substrate and the filter. On the substrate, there exist a plurality of thin film transistors arrayed and a control circuit in charge of displaying pictures or text. The color filter is used for mixing the three primary colors: red, green, and blue. As the liquid crystal panel cannot radiate by itself, an external light source is required to provide the display with effects on uniformity, high intensity, and broad viewing angle. According to the type of displays, plane light source can normally be divided into two categories, a back light module and a front light module, wherein the back light module, disposed at the back of a liquid crystal panel, is normally used for a transmissive display, while the front light module, disposed at the front of a liquid crystal panel, is primarily used for a reflective or a half-reflective display.

Regardless of either a reflective or a transmissive type for the liquid crystal display, if the absorption of a color filter or the density of pigments on the filter were too high, the transmissivity would decrease a lot. The brightness of the display is thus extremely limited, and therefore it needs to take the limit into account while designing a display of high brightness.

Please refer to FIG. 1A, showing explodedly a typical arrangement of pixels on a conventional liquid crystal panel. The conventional liquid crystal panel 10 has a bottom substrate 11, a top substrate 12, and a plurality of pixels 13. Each pixel 13 has a red sub-pixel 131, a green sub-pixel 132, and a blue sub-pixel 133. Each sub-pixel is a cubic structure. For example, the structure of red sub-pixel 131 has a photo-resistant layer 121 formed on the bottom surface of the top substrate 12, a thin film transistor 111, a pixel electrode 112 on the top surface of the bottom substrate 11, and a liquid crystal layer 14 in between the photo-resistant layer 121 and the pixel electrode 112.

Recently, to increase the brightness of liquid crystal 10, another sub-pixel of different color, such as a white one, is added to each pixel 13. As the backlight source (not shown in the figure) for liquid crystal panel 10 is normally white light, only a transparent area is added to the top substrate 12, thereby each pixel having four sub-pixels with colors: red, green, blue, and white. Existing arrangements for these four sub-pixels can be shown in FIG. 1B-1C, in both where a transparent photo-resistant layer together with three photo-resistant layers: red layer 121, green layer 122, and blue layer 123, is used for enhancing brightness of the pixel. FIG. 1B shows a stripe arrangement while FIG. 1C shows a mosaic arrangement.

Provided that the transmissivity of a material is 100%, because photo-resistant layers, 121, 122, or 123, have their own colors, only the light of the color can pass through. As to one of sub-pixels, 131, 132, 133, of three primary colors, only one of three color lights can pass through and therefore the amount of brightness is reserved by merely one third. As for pixel 13 consisting of sub-pixels, 131, 132, 133, of three primary colors, each transmissive area of sub-pixels, 131, 132, 133, occupies the transmissive area of pixel 13 by one third, and therefore the total amount of the transmissive light through pixel 13 is by one third ($3 \times 1/3 \times 1/3 = 1/3$). After transparent photo-resistant layer 124 is added to top substrate 12, pixel 13 now contains 4 sub-pixels where the transmissive area of each sub-pixel occupies the transmissive area of pixel 11 by one fourth. Provide that the transmissivity of transparent photo-resistant layer 124 is 100%, the total amount of transmissive light through such a pixel is by one half, which is great than one third (i.e, $3 \times 1/3 \times 1/4 + 1 \times 1/4 = 1/2 > 1/3$). This leads to changing the arrangement of pixels on top substrate 12 by substituting photo-resistant layers, 121, 122, 123, of three primary colors in addition to transparent photo-resistant layer 124 (RGB+W) for photo-resistant layers, 121, 122, and 123, of three primary colors (RGB). Transparent area 124 is used for increasing the amount of transmissive light such that all colors become brighter. However, the mixture of white light makes screen whiter and decreases the degree of color saturation.

As above mentioned, the brightness of liquid crystal display is limited by the transmissivity of photo-resistant layers. To increase the amount of transmissive light, it is required to add a white sub-pixel and then change the arrangement of pixels. However, because prior arts cannot effectively control the amount of transmissive light of white sub-pixel, after increasing the amount of tranmissive light through white sub-pixel, the saturation of sub-pixels of three primary colors is degraded. The present invention changes the pixel structure on a display and simultaneously applies circuit control to enhance the chromaticity and brightness for the display.

SUMMARY OF THE INVENTION

Accordingly, the objects of the present invention are:

(a) to provide a pixel of the type that renders light compensation to the conventional sub-pixels of three primary colors-red, green, and blue; and (b) to provide a control system that calculates the best combination of control signals and thereafter inputs the signals to each sub-pixel for yielding the best effect on mixture of colors for the pixel.

The pixel on the display panel of the present invention comprises three sub-pixels. Each sub-pixel can be divided into a first transmissive area and a second transmissive area, wherein the first transmissive area is equipped with a first transistor and a first photo-resistance layer while the second transmissive area is equipped with a second transistor and a second photo-resistance layer. Both the first and the second photo-resistant layer are formed on a filter panel and they have different thickness or area. There exists a function relation of the signals received by the first transistor and by the second transistor. Two data sets of signals combined with the two different thickness or area of the first and second photo-resistant layers lead each sub-pixel to yield new level of intensity in gray scale and to increase the number of displaying colors.

To provide the first transistor and the second transistor with proper data signals, the present invention provides a control system of the type which renders the signal control to the above pixel. The control system mainly includes a demultiplexer and a multiplexer. After receiving a control signal, the demultiplexer processes the control signal by a function to obtain a first signal, and thereafter outputs the control signal and the first signal to the multiplexer. After receiving the control signal and the first signal, the multiplexer processes the control signal by an algorithm to transfer the control signal to a second signal, and thereafter the first signal is transmitted to the first transistor while the second signal to the second transistor.

The structure of the pixel consisting of the first transmissive area and the second transmissive area in addition to the mechanism of circuit control system leads to enhancing the level of brightness and increasing the degree of saturation.

All these objects are achieved by the pixel structure and the control system for controlling the pixel structure described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a pixel structure and a control system for controlling the pixel structure. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1A:
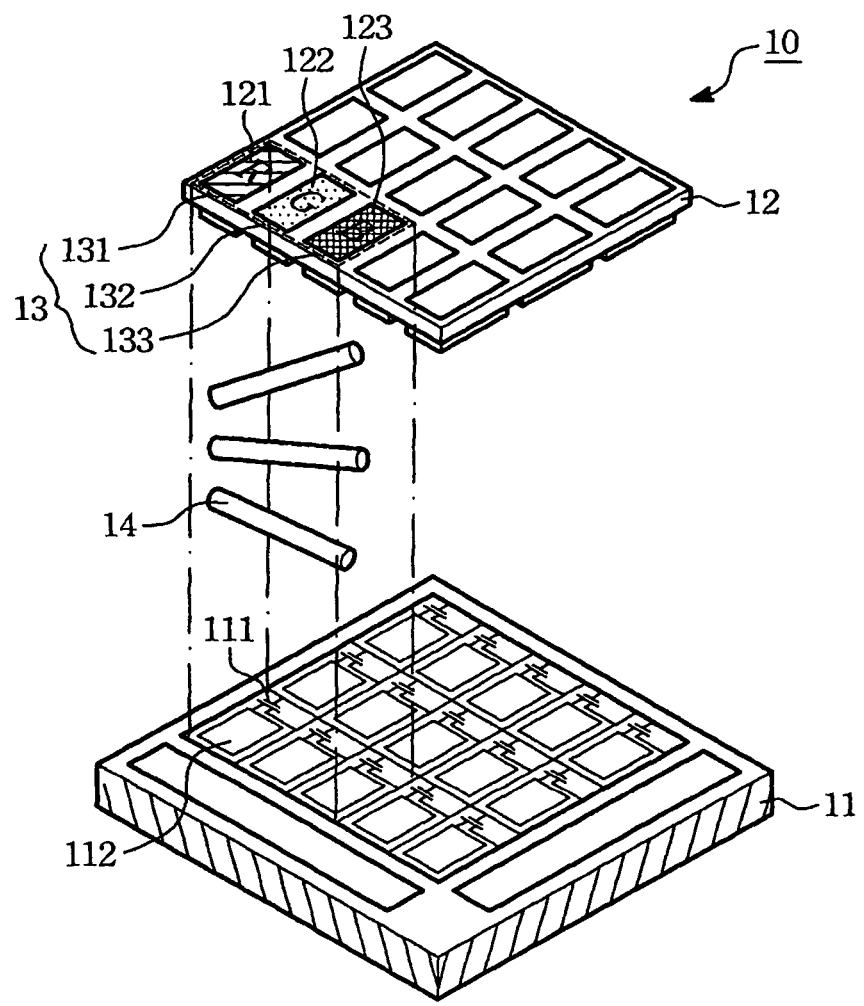
FIG. 1A shows explodedly a typical arrangement of pixels on a conventional liquid crystal panel.
Figure 1B:
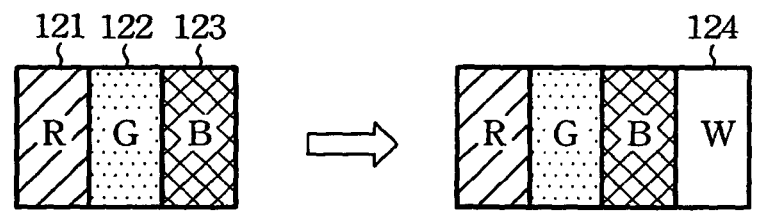
FIG. 1B shows a conventional arrangement of a typical pixel in a strip shape.
Figure 1C:
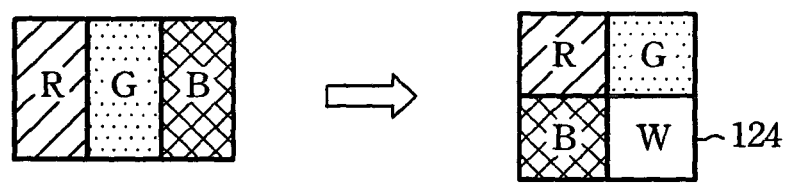
FIG. 1C shows another conventional arrangement of a pixel in a mosaic shape.
Figure 2A:
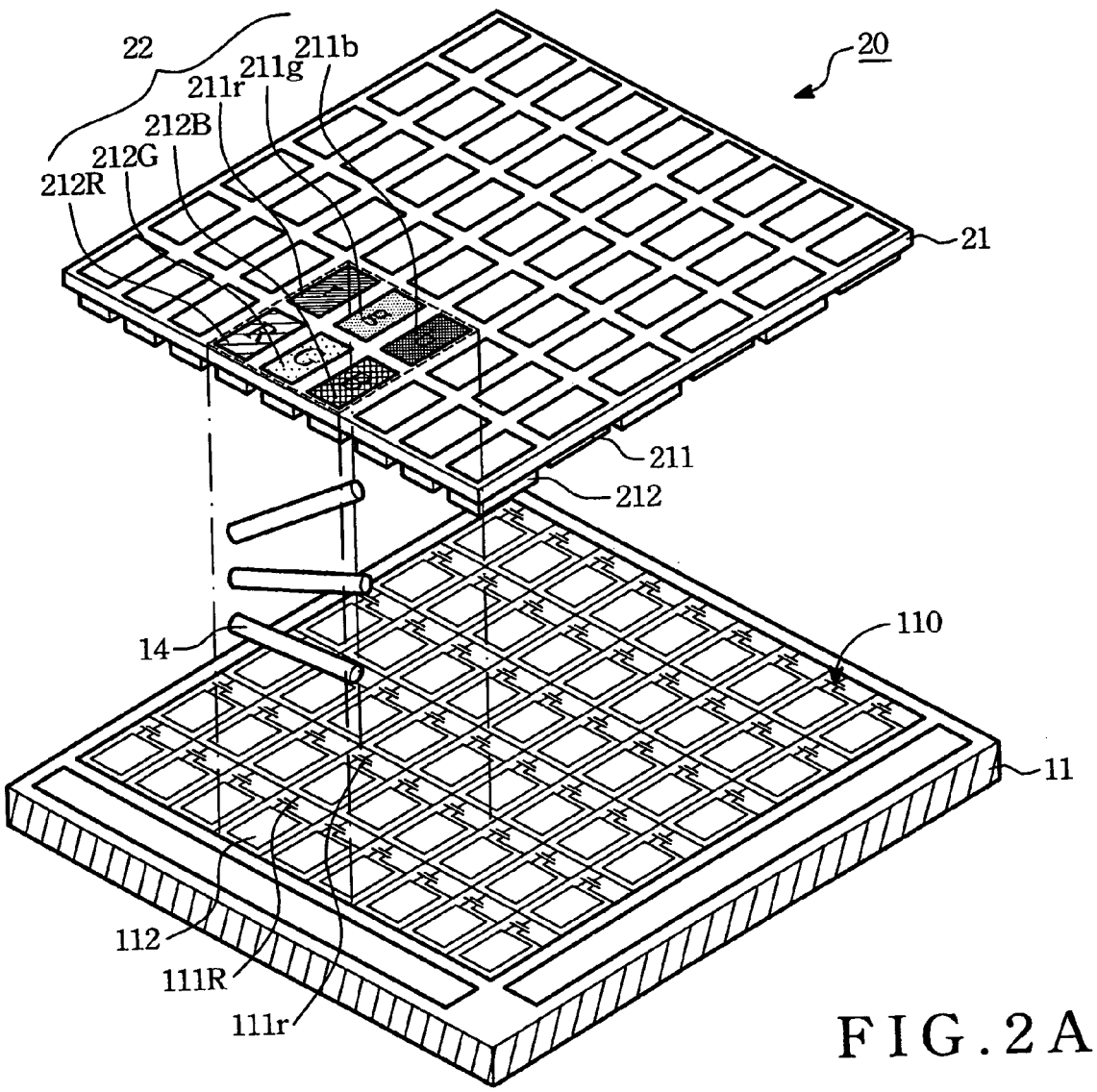
FIG. 2A shows explodedly the liquid crystal panel with the pixel structure of the present invention.

The "pixel unit and its control system" is illustrated in details and the preferred embodiments are listed as follows:

Please refer to FIG. 2A, showing a liquid-crystal panel 20 that has the pixel structure of the present invention. Panel 20 comprises a substrate 11, a liquid crystal layer 14, and a filter 21. On substrate 11 there exists a thin-film array 110 that includes a plurality of thin film transistors 111 and a plurality of pixel electrodes 112. On the bottom surface of panel 21 there are at least a first photo-resistant layer 211 and a second photo-resistant layer 212; furthermore, the transmissivity of layer 211 is larger than that of layer 212, whereby a preferred embodiment is performed by rendering the thickness of layer 211 less than that of layer 212. As FIG. 2A shows, layer 211 presents as a thin red photo-resistant layer 211r, a thin green photo-resistant layer 211g, or a thin blue photo-resistant layer 211b, while layer 212 presents as a thicker red photo-resistant layer 211R, a green photo-resistant layer 211G, or a blue photo-resistant layer 211B. Thin film transistor array 110, filter 21, and liquid crystal layer 14 form a plurality of pixels 22.

Figure 2B:
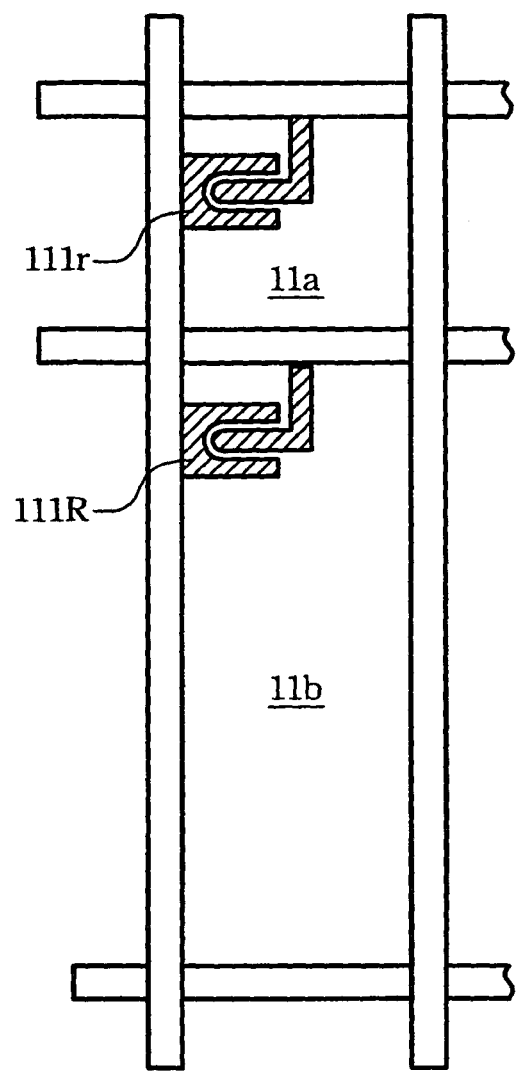
FIG. 2B shows preferred positions of a thin film transistor and its control area on a pixel of FIG. 2A.

Please refer to FIG. 2B wherein a sub-pixel of pixel 22 includes at least two thin film transistors, 111R and 111r, which are disposed respectively in a first transmissive area 11a and in a second transmissive area 11b, where area 11a and 11b are adjacent to each other and both on substrate 11. In addition, area 11a is used for light compensation. Filter 21 is disposed above thin film transistor array 110, and layer 211 covers area 11a while layer 212 covers area 11b. FIG. 2A shows a preferred embodiment wherein pixel 22 includes six transmissive areas (not marked in the figure) arranged in two rows by three columns. Corresponding to the positions of arrangement of transmissive areas, the positions of layers, 211r, 211R, 211g, 211G, 211b, and 211B, on filter 21 are also arranged in two rows by three columns and then an pattern interleaved is formed by photo-resistant layers with different thickness.

Figure 3A:
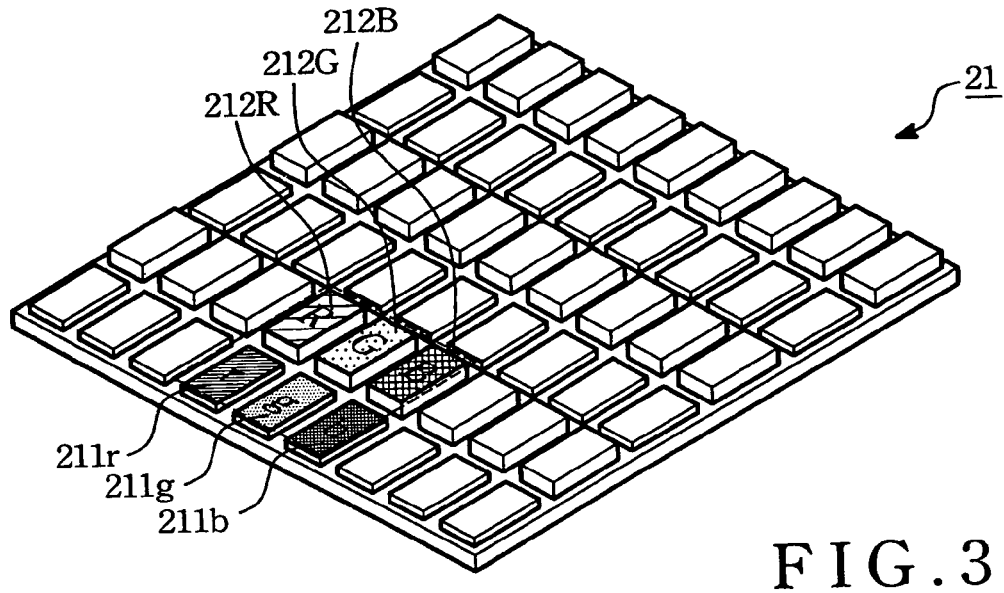
FIG. 3A-3B show two filter structures of photo-resistant layers of different thickness in accordance with the present invention.
Figure 3B:
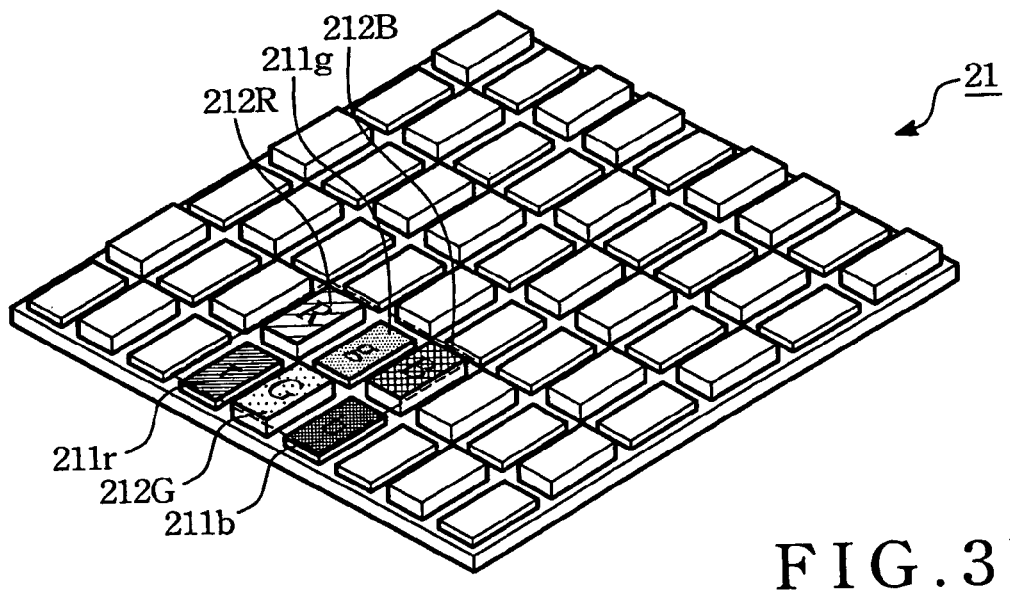

FIG. 3A-3B shows the structures of photo-resistant layers with different thickness arranged on filter 21. In FIG. 3A six photo-resistant layers correspond to six transmissive areas in the same pixel. Red layer 211R, green layer 211G, and blue layer 211B, are disposed in the first row; all of them are of thick layers. Thin red layer 211r, thin green layer 211g, and thin blue layer 211b are all disposed in the second row, thereby rendering the thickness of the photo-resistant layers of sub-pixels in the second row smaller than that of the layers in the first row. FIG. 3B shows that the positions of red layer 211R, green layer 211G, and blue layer 211B, are arranged in different rows. Therefore, in FIG. 3A any attempts to form the structure of a pixel by exchanging the positions between red layer 211R and thin red layer 211r, between green layer 211G and thin green layer 211g, or between blue layer 211B and thin blue layer 211b, are still in the scope of the present invention.

Figure 4A:
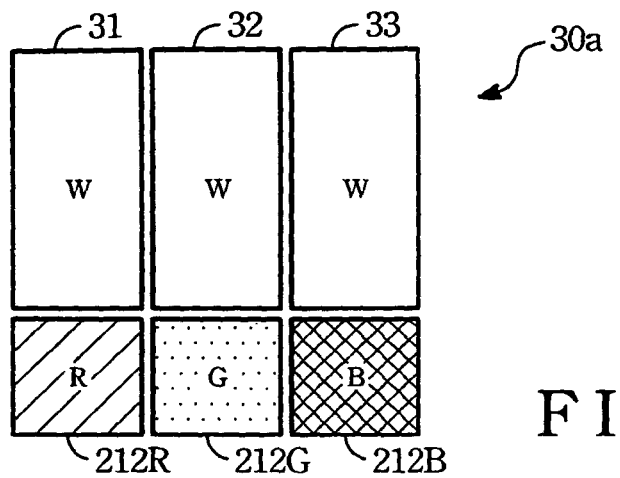
FIG. 4A-4C show cover areas and arrangements of three photo-resistant layers on a pixel of the present invention.
Figure 4B:
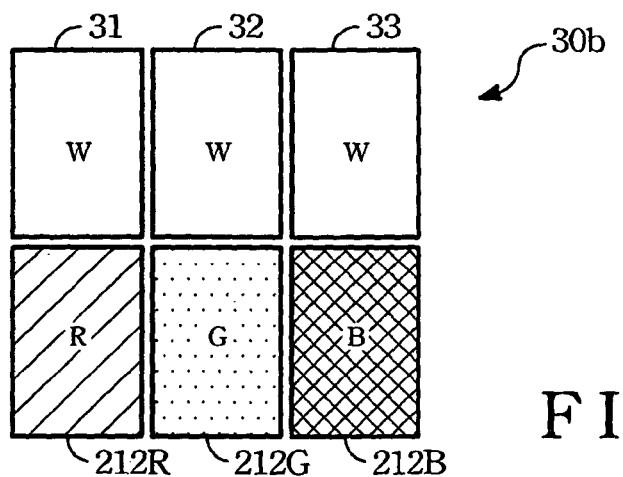
Figure 4C:
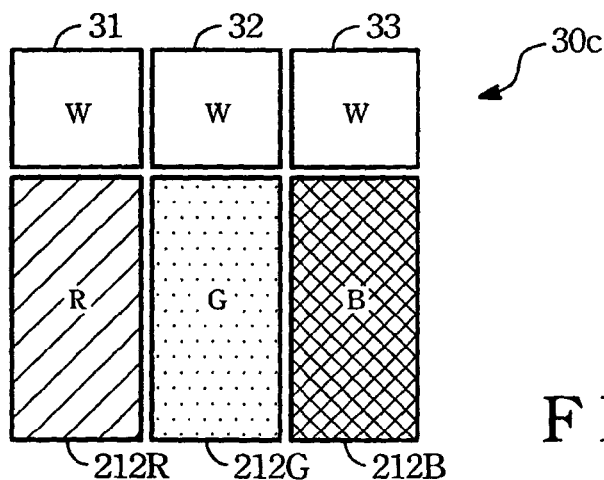

Please refer to FIG. 4A-4C, showing the size of cover area and the status of arrangement of photo-resistant layers in the pixel. In FIG. 4A filter 30a includes six photo-resistant layers, wherein each cover area of the three transparent photo-resistant layers, 31, 32, and 33, in the upper row is bigger than that of any of red layer 212R, green layer 212G, and blue layer 212B, in the lower row. In FIG. 4B filter 30b includes six photo-resistant layers, wherein each cover area of the three transparent photo-resistant layers, 31, 32, and 33, in the upper row is equal to that of any of red layer 212R, green layer 212G, and blue layer 212B, in the lower row. In FIG. 4C filter 30c includes six photo-resistant layers, wherein each cover area of the three transparent photo-resistant layers, 31, 32, and 33, in the upper row is smaller than that of any of red layer 212R, green layer 212G, and blue layer 212B, in the lower row. In FIG. 4A-4C, the relation of cover area of photo-resistant layers in the same column can be exchanged; for instance, in FIG. 4A the cover area of thin transparent layer 31 can be exchanged with that of red layer 212R.

The first photo-resistant layer 211 as above can be of monochromatic or transparent, such as transparent, red, green, blue, or any other color. Both the combination and permutation of colors for first photo-resistant layer 211 of three sub-pixels are not limited, such as red-green-blue, red-blue-green, white-white-blue, and the like; the permutation and combination are decided according to demands.

Figure 5A:
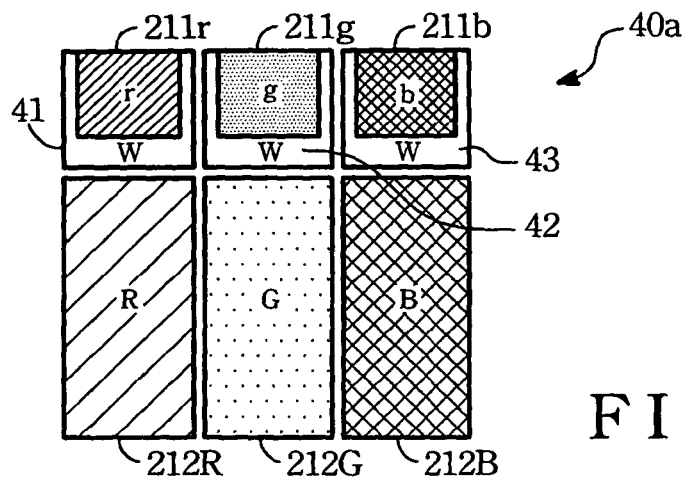
FIG. 5A-5E show filter structures of five different color combinations in accordance with the present invention.
Figure 5B:
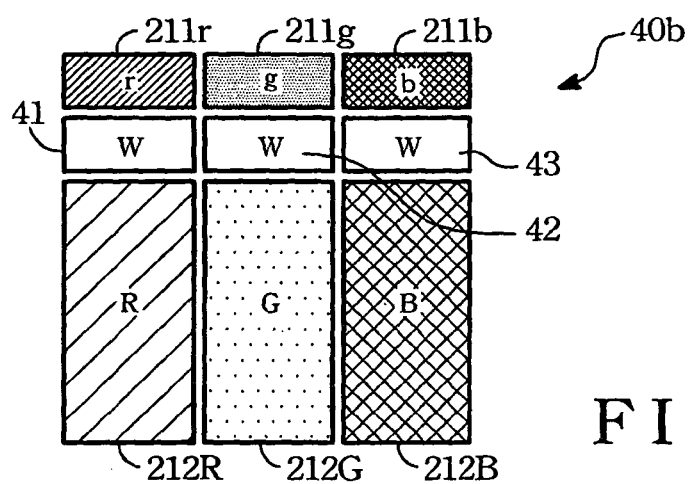
Figure 5C:
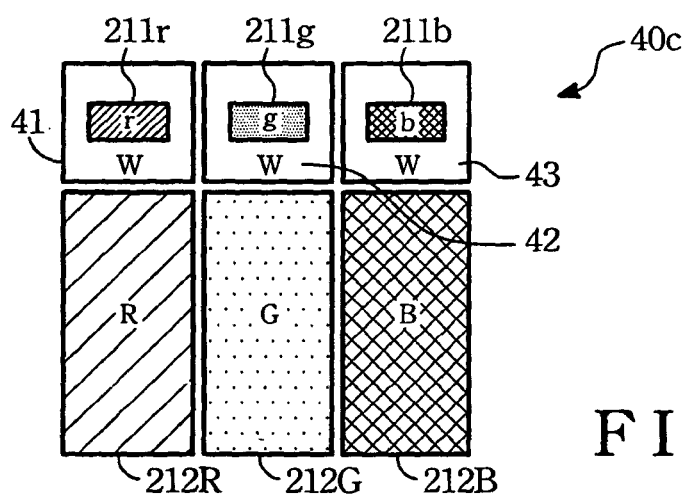
Figure 5D:
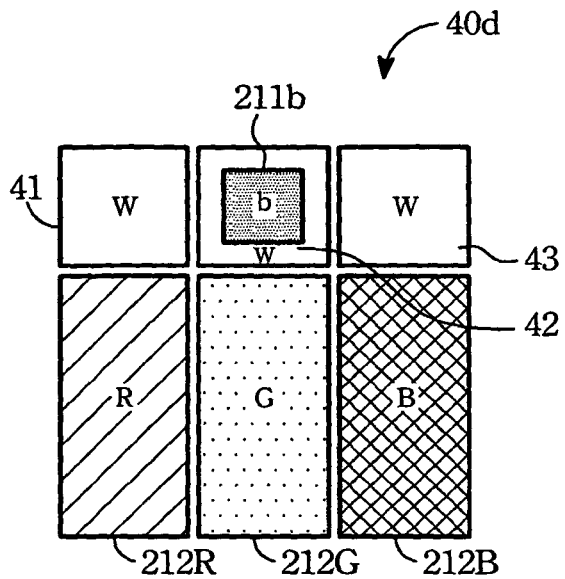
Figure 5E:
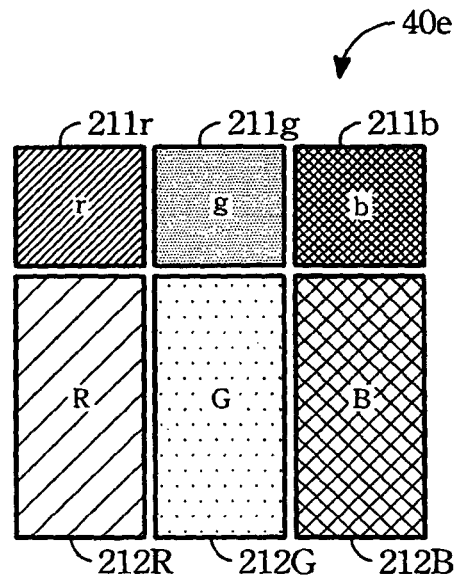

Please refer to FIG. 5A-5D wherein first photo-resistant layer 211 can be of a structure combining part of color and part of transparent. Please refer to FIGS. 5A, 5C and 5D, where each of filters—40a, 40c, and 40d, includes a transparent photo-resistant layer 41 that encircles thin red photo-resistant layer 211r, and then layer 41 along with layer 211r covers first transmissive area 11a. In FIG. 5A the cover area of layer 41 is smaller than that of thin red layer 211r while in FIG. 5C the cover area of layer 41 is bigger than that of thin red layer 211r. In addition, the brightness of second transmissive area 11b of the sub-pixels of the three primary colors, red, green, and blue, can be adjusted by controlling the thickness or area of transparent layers—41,42, and 43 in 11a or of color layers—211r, 211g, and 211b. FIG. 5D shows the way to increase the intensity of blue in gray scale alone in the pixel so as to increase the saturation of blue. Hence, only green photo-resistant layer 212G combined with thin blue photo-resistant layer 211b is on filter 40d, thereby enhancing brightness by using transparent layer 42.

Figure 6A:
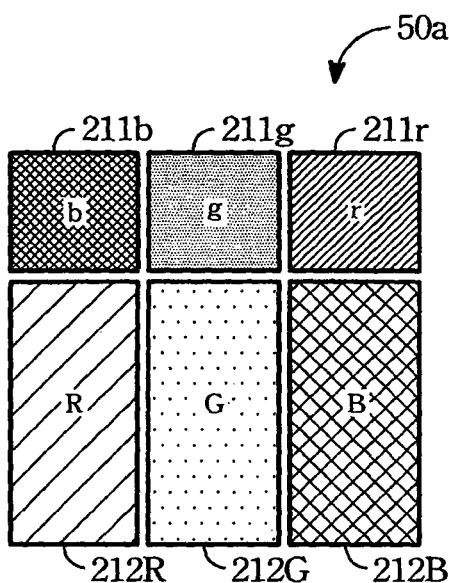
FIG. 6A-6B show filter structures of two different color permutations in accordance with the present invention.
Figure 6B:
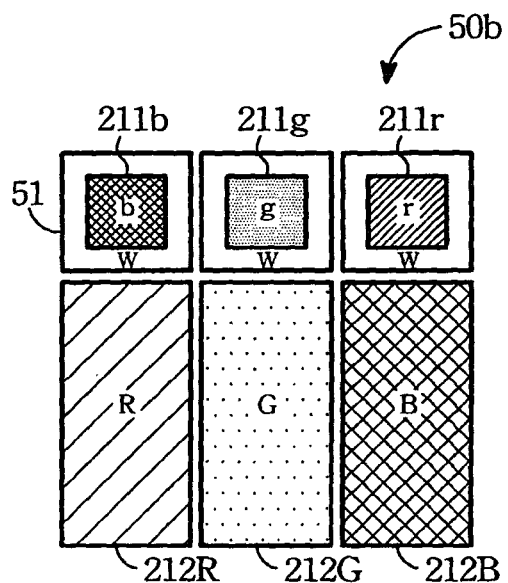

Please refer to FIG. 6A-6B wherein first photo-resistant layer 211 and second photo-resistant layer can be layers of different colors. In FIG. 6A, filter 50a is formed by combining thin blue photo-resistant layer 211b with red photo-resistant layer 212R. In FIG. 6B shows in first transmissive area 11a the cover area of thin blue layer 211b, thin green layer 211g, or thin red layer 211r, is approximately equal to that of transparent photo-resistant layer 51. Consequently, when displaying a monochromatic color, the pixel can provide higher brightness than a conventional one, and maintain the degree of saturation.

Integrating the concept of different thickness of photo-resistant layers in FIG. 3A-3B and the status of various area arranged in FIG. 5A-5D and FIG. 6B, layer 211 can be formed by both transparent photo-resistant layers and color photo-resistant layers with different thickness or area, wherein both layers are together to cover first transmissive area 11a. In a preferred embodiment, color photo-resistant layer is thinner than transparent layer that compensates brightness and chromaticity, where second photo-resistant layer 212 is a thicker monochromatic photo-resistant layer. For the sake of saturation, it prefers that the area of second layer 212 is bigger than first layer 211. The structure of the present invention designed for color perception by human being can lead eyes to perceive higher brightness of the display and can introduce more level of intensity in gray scale to be discerned so as to increase the types of display colors. It shows a better effect that applying this structure to a liquid crystal transmissive panel.

Figure 7:
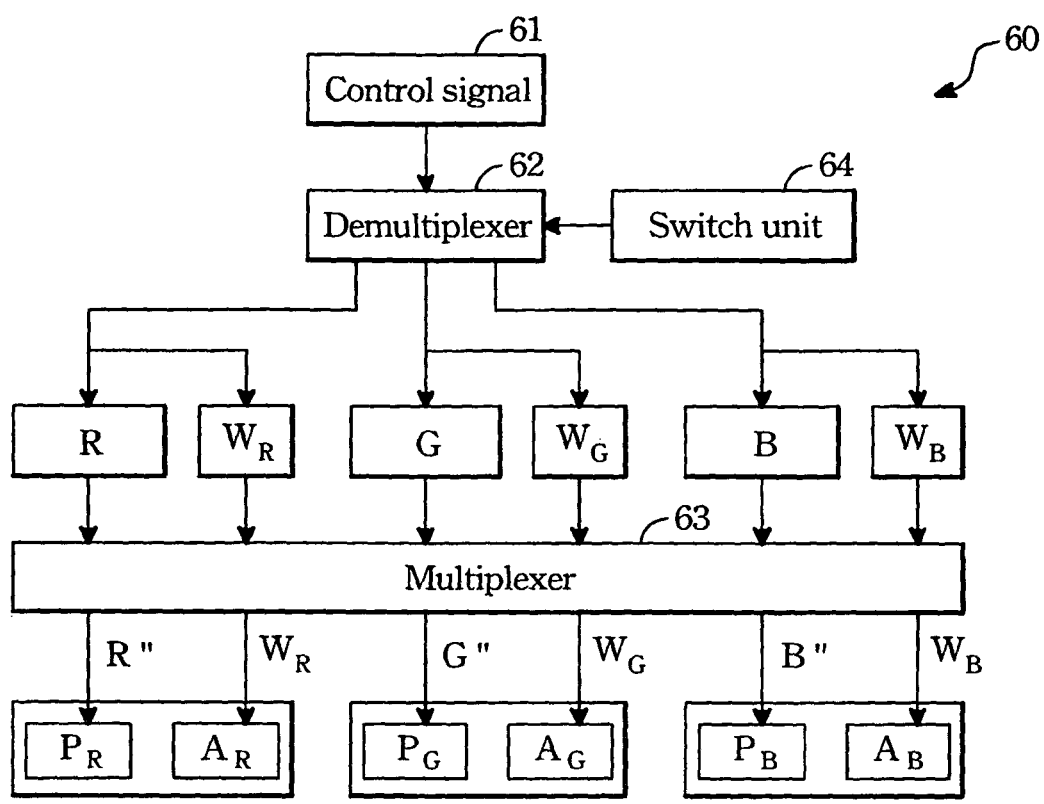
FIG. 7 shows a preferred control system for the liquid crystal panel of the present invention.

Please refer to FIG. 7, showing a control system for the liquid crystal panel of the present invention. A control system 60 mainly comprises a demultiplexer 62 and a multiplexer 63. After receiving a control signal 61, demultiplexer 62 processes signal 61 by a function as to demultiplex a first signal, and then outputs control signal 61 and the first signal to multiplexer 63. As well as referring to FIG. 2B, after receiving signal 61 and the first signal from the output of demultiplex 62, multiplexer 63 processes signal 61 by an algorithm for transferring it to a second signal, and then outputs the first signal to thin-film transistor 111r in first transmissive area 11a and the second signal to thin-film transistor 111R in second transmissive area 11b. In FIG. 7, a red light area $P_R$, a green light area $P_G$, and a blue light area $P_B$ are of second transmissive area 11b as above while a red light compensation area $A_R$, a green light compensation area $A_G$, and a blue light compensation area $A_B$ are of first transmissive area 11a as above mentioned.

On the control circuit, the input control signal 61 includes three sub-signals of R, G, B. First, signal 61 is separated into sub-signals of R,G,B, through demultiplexer 62, then sub-signals are processed via three mapping functions, and thereafter sub-signals is expanded into sub-signal R and corresponding first signal WR, sub-signal G and corresponding first signal WG, sub-signal B and corresponding first signal WB. These independent sub-signals, R,G,B, are again processed by mutiplexer 63 by an algorithm to be transferred to second signals, R",G",B", and then delivering the second signals, R",G",B", to red light area $P_R$ of the red pixel, to green light area $P_G$ of the green pixel, and to blue light area $P_B$ of the blue pixel, respectively, while first signals, WR, WG, WB are delivered to red light compensating area $A_R$, to green light compensating area $A_G$, and to blue light compensating area $A_B$, respectively.

The task of mapping functions of demultiplexer is to calculate three first signals, WR, WG, WB, such that the combination of the first transmissive area of the three sub-pixels and the second transmissive area can yield the best effect on colors, that is, increasing the degree of saturation or the level of brightness.

In control system 60, how to generate second signals, R", G", B", depends on both first signals, WR, WG, WB, and sub-signals, R, G, B. The generation of first signals, WR, WG, WB, is determined by processing sub-signals, R, G, B, through the mapping function of demultiplexer 62. The voltages in the first transmissive area and the second transmissive area are controlled by different thin film transistors. Moreover, demultiplexer 62 contains a switch 64 for selecting whether to demultiplex control signal 61 through mapping function for generating first signals, WR, WG, WB. First signals, WR, WG, WB, can be assertive close or open the voltage signal or current signal in the first transmissive area.

Compared with the prior arts, the pixel with its control system of the present invention has the following objects and advantages:

1. The present invention proposes a pixel structure of the type formed by six transmissive areas of three sub-pixels as well as a control mechanism of IC circuit, thereby increasing the brightness of liquid crystal panel and enhancing the degree of saturation.

2. In the pixel of the present invention, each of the sub-pixels has two transmissive areas where the object of the first transmissive area is to increase the amount of light passing the pixel, thereby increasing the brightness of liquid crystal panel and enhancing the degree of saturation.

3. The chromatic aliasing produced by the combination of the conventional colors-transparent(W), red(R), green(G), and blue(B) can be corrected, thereby increasing the accuracy of hue and enhancing the degree of saturation.

4. According to the users under different environments, a switch can be used to assertively close all the first transmissive areas so that the brightness of display is suitable for users while working on word processing, or to assertively open all the first transmissive areas for increasing the brightness of liquid crystal panel and enhancing the degree of saturation so that the condition of display is suitable for users while playing games or working on graphics.

The above detailed illustration is a substantial description for the preferred embodiments of the present invention. However, these embodiments as above mentioned should not be construed as limiting the scope of the invention. All equivalent embodiments or any minor modifications will not exempt from infringing the objects of the present invention and should be considered within the scope of patent of this case.

While the present invention has been particularly shown and described with reference to a preferred embodiment, it will be understood by those skilled in the art that various changes in form and detail may be without departing from the spirit and scope of the present invention.

We claim:

1. A pixel unit of a liquid crystal panel, comprising:

three sub-pixels, wherein each of said sub-pixels is divided into a first transmissive area and a second transmissive area, said first transmissive area having a first transistor therein, said second transmissive area having a second transistor therein; and a filter, disposed on said three sub-pixels, further having a first photo-resistant layer corresponding to said first transmissive area and a second photo-resistant layer corresponding to said second transmissive area whereas a thickness of said first photo-resistant layer is thinner than a thickness of said second photo-resistant layer;

wherein an input signal of said first transistor is a function of another input signal of said second transistor and thereby each said sub-pixel is able to generate new levels of brightness in gray scale and increase the number of colors.

2. The pixel unit of claim 1, wherein said first photo-resistant layer comprises a transparent photo-resistant layer enclosing a color photo-resistant layer thereof, wherein said first transmissive area is covered by said transparent photo-resistant layer and said color photo-resistant layer, and said color photo-resistant layer and said transparent photo-resistant layer are formed in one layer.

3. The pixel unit of claim 2, wherein said transparent photo-resistant layer has an area bigger than another area of said color photo-resistant layer.

4. The pixel unit of claim 2, wherein said area of said transparent photo-resistant layer is smaller than said area of said color photo-resistant layer.

5. The pixel unit of claim 1, wherein said first photo-resistant layer is formed by a transparent photo-resistant layer and a color photo-resistant layer, wherein said first transmissive area is covered in parallel by said transparent photo-resistant layer and said color photo-resistant layer.

6. The pixel unit of claim 1, wherein an area of said first photo-resistant layer is equal to another area of said second photo-resistant layer.

7. The pixel unit of claim 1, wherein an area of said first photo-resistant layer is bigger than another area of said second photo-resistant layer.

8. The pixel unit of claim 1, wherein an area of said first photo-resistant layer is smaller than another area of said second photo-resistant layer.

9. The pixel unit of claim 1, wherein said first photo-resistant layer is different in color from said second photo-resistant layer.

10. The pixel unit of claim 1, wherein a color of said first photo-resistant layer is the same as another color of said second photo-resistant layer.

11. The pixel unit of claim 1, wherein the thickness of said first photo-resistant layer and said second photo-resistant layer are measured according to the normal of the plain of the liquid crystal panel.

12. A pixel unit of a liquid crystal panel, comprising:

three sub-pixels, wherein each of the sub-pixels is divided into a first transmissive area and a second transmissive area, said first transmissive area has a first transistor therein, said second transmissive area has a second transistor therein; and a filter, disposed on said three sub-pixels, having a transparent photo-resistant layer corresponding to said first transmissive area and a color photo-resistant layer corresponding to said second transmissive area;

wherein an input signal of said first transistor is a function of another input signal of said second transistor and, by providing different thickness to said photo-resistant layers, each sub-pixel is able to generate new levels of brightness in gray scale and increase the number of colors.

13. The pixel unit of claim 12, wherein said transparent photo-resistant layer encloses another corresponding color photo-resistant layer inside said first transmissive area, wherein said color photo-resistant layer and said transparent photo-resistant layer are formed in one layer.

14. The pixel unit of claim 13, wherein said transparent photo-resistant layer is bigger in area than said color photo-resistant layer inside said first transmissive area.

15. The pixel unit of claim 13, wherein said transparent photo-resistant layer is smaller in area than said color photo-resistant layer inside said first transmissive area.

16. The pixel unit of claim 12, wherein said transparent photo-resistant layer and another corresponding color photo-resistant layer are arranged in parallel inside said first transmissive area.

17. The pixel unit of claim 12, wherein the different thickness to said photo-resistant layers are measured according to the normal of the plain of the liquid crystal panel.

* * * * *